G. F. SCHMIDT.
CARBURETER.
APPLICATION FILED MAR. 27, 1908.
923,377.
Patented June 1, 1909.
2 SHEETS—SHEET 1.
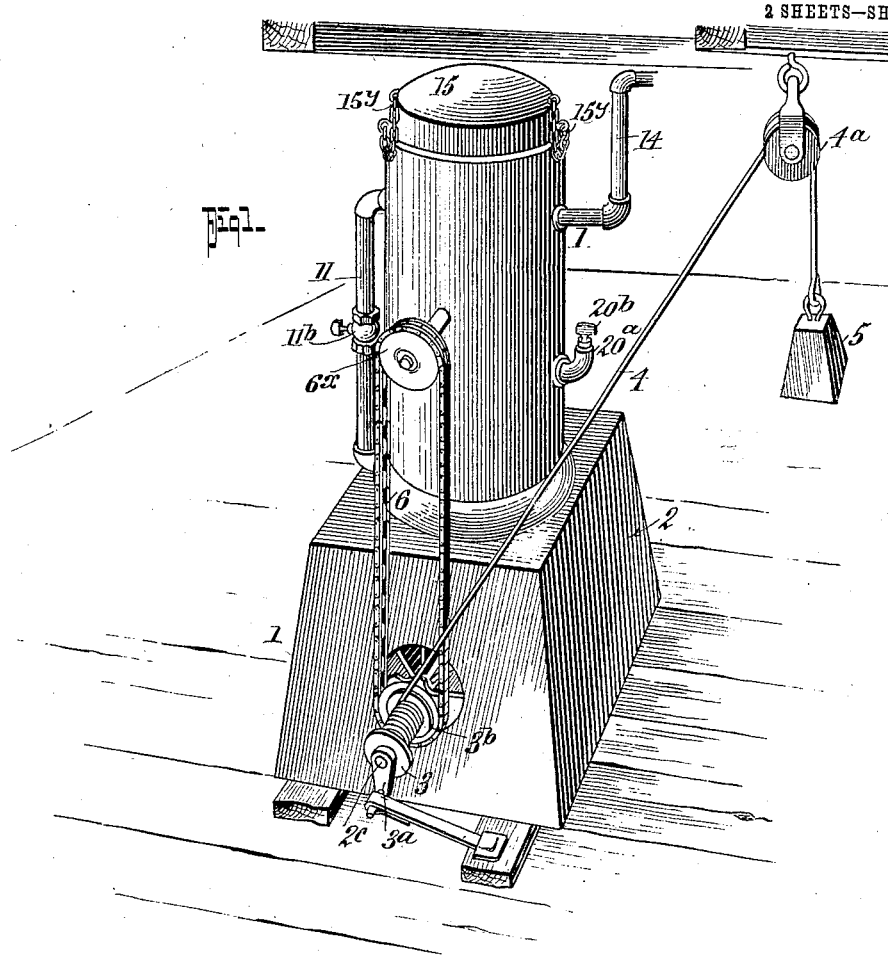
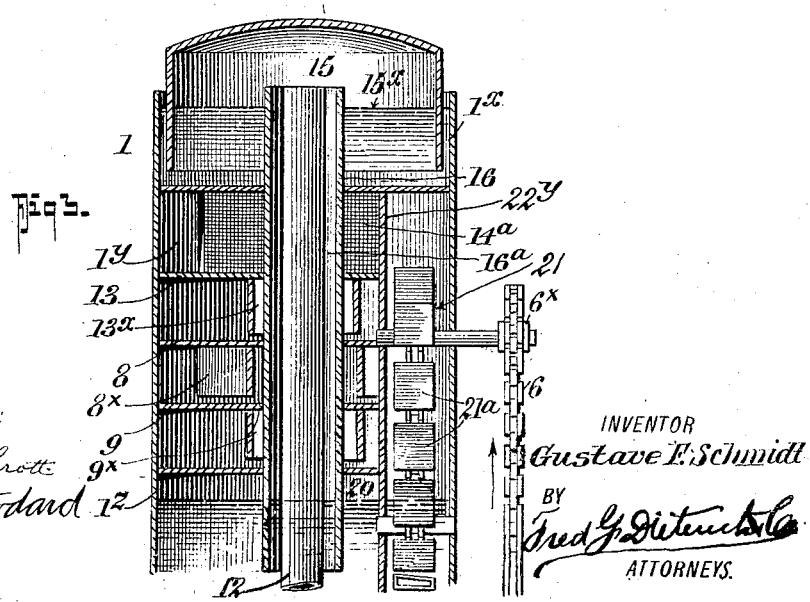
WITNESSES:
John T. Schrott
Hayward Woodard
INVENTOR
Gustave F. Schmidt
BY
Fred G. Dieterich & Co
ATTORNEYS.

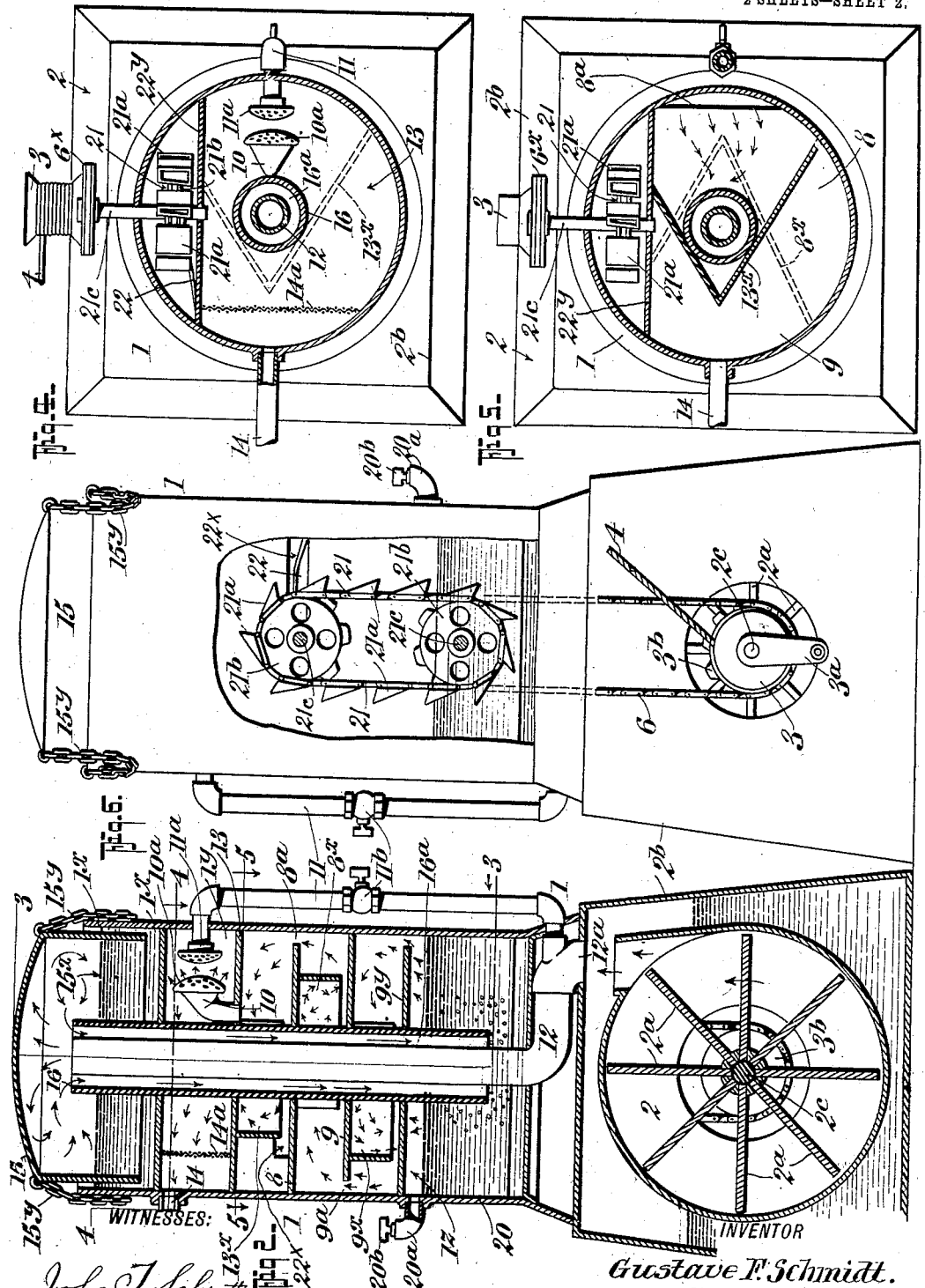

UNITED STATES PATENT OFFICE.

GUSTAVE FRANZ SCHMIDT, OF RICHMOND, VIRGINIA, ASSIGNOR OF FORTY-FIVE ONE-HUN-DREDTHS TO HENRY T. TEEL, OF RICHMOND, VIRGINIA, AND ONE-HALF TO THE CARD-WELL MACHINE COMPANY, OF RICHMOND, VIRGINIA, A CORPORATION OF VIRGINIA.

CARBURETER.

No. 923,377.　　　Specification of Letters Patent.　　　Patented June 1, 1909.

Application filed March 27, 1908. Serial No. 423,721.

*To all whom it may concern:*

Be it known that I, GUSTAVE F. SCHMIDT, residing at Richmond, in the county of Henrico and State of Virginia, have invented certain new and useful Improvements in Carbureters, of which the following is a specification.

My invention relates to certain new and useful improvements in machines for carbureting air with gasolene for producing a gas for illuminating and other purposes, and in its generic nature the invention comprises a gasometer having provisions for exposing the gasolene to a current of air set in motion by a fan, means for continuously supplying the gasolene from a reservoir to the exposed portions of the vaporizing chamber where it can come into contact with the air and become vaporized, and means for maintaining a constant air current together with means for simultaneously operating both the gasolene elevator and the fan.

Again, my invention has for its object to provide a supplemental air feeding device, by means of which the gas generated may be diluted, if desired, to make it suitable for its required use.

In its more detail nature, the invention embodies certain novel details of construction, combination and arrangement of parts, all of which will be first described in detail and then be specifically pointed out in the appended claims, reference being had to the accompanying drawings, in which:—

Figure 1, is a perspective view of my invention. Fig. 2, is a central vertical longitudinal section of my invention. Fig. 3, is a vertical section on the line 3—3 of Fig. 2. Fig. 4, is a horizontal section on the line 4—4 of Fig. 2. Fig. 5, is a similar view on the line 5—5 of Fig. 2. Fig. 6, is a rear elevation partly in section.

Referring now to the accompanying drawings, in which like letters and numerals of reference indicate like parts in all of the figures, 1 designates the casing which is mounted over the blower mechanism 2, which blower mechanism includes a rotary fan $2^a$, and the blower casing $2^b$ in which the fan shaft $2^c$ is journaled, the shaft $2^c$ projecting to the outside of the casing and carrying a windlass 3 having a crank $3^a$, by means of which it may be turned. The windlass 3 is adapted to receive a cable 4 which passes over an idler pulley $4^a$ and is attached to a weight 5, for a purpose which will presently appear. The windlass 3 includes a sprocket-wheel $3^b$ around which the drive belt or chain 6, for the elevator passes. The casing which is divided into three chambers has an upper chamber $1^x$, intermediate $1^y$ and lower chamber $1^z$, the lower chamber $1^z$ being divided into supplemental chambers by the horizontal partitions 8 and 9, the partitions 8 and 9 having oppositely disposed openings $8^a$—$9^a$, whereby communication may be had between the various sections of the lower compartment $1^z$. The lower compartment $1^z$ above the partition 8 is in communication with the intermediate chamber $1^y$, through a funnel 10 that has an outlet preferably formed of a perforated surface $10^a$ to discharge against a perforated nozzle $11^a$ of a supplemental air feed pipe 11 controlled by a valve $11^b$ and in communication with the main air pipe 12, adjacent to the blower casing $2^b$.

The under walls of the partitions 8 and 9 are provided with V-shaped baffles $8^x$—$9^x$ which extend nearly the entire distance between the partitions and the next adjacent wall surface, the baffle $8^x$ extending nearly to the partition 9, while the baffle $9^x$ extends nearly to a supplemental partition $9^y$ which forms the top of the gasolene chamber 20. Gasolene is admitted to the chamber 20 through an inlet pipe $20^a$, closed by a cap $20^b$, as indicated, or in any other approved manner. The bottom wall 13 of the chamber $1^y$ is provided, on its under surface, with a baffle $13^x$ similar in form to that of the baffle $8^x$, but disposed oppositely therefrom and spaced nearly to the partition 8. The gas is taken off through an outlet pipe 14, from the chamber $1^y$, a screen $14^a$ of fine gauze wire being stretched across the chamber $1^y$ over the outlet 14 to act as a filtering medium.

15 designates a gasometer bell, which projects into the chamber $1^x$ of the machine and is water sealed as at $15^x$, limiting chains or cables $15^y$ being provided to limit the movement of the bell 15.

The air pipe 12 has its entry end $12^a$ in communication with the blower casing $2^b$ and passes up centrally through the chambers $1^z$, $1^y$ and $1^x$ and extends to the top of said chamber $1^x$. Surrounding the pipe 12 and spaced therefrom to provide a return passage 16ª, is a pipe 16 whose upper end is about level with the top of the casing 1 and with that of the pipe 12, and whose lower end terminates in the gasolene chamber 20 so that as the air is pumped by the blower 2ª through the pipe 12, it will be discharged into the bell 15 and return through the passage 16ª into the gasolene where it is liberated, causing the gasolene to become vaporized and the vapors pass in the direction of the arrows in Fig. 2, between the partitions 9ʸ, 9 and 8, allowing the gasolene to become thoroughly vaporized and any excess gasolene that should become condensed will deposit upon the partitions 8, 9 and 9ʸ and flow back into the gasolene tank 20, unless sooner again vaporized by the passing current of gasolene and air. From the top of the chamber 1ᶻ the vaporized gasolene and air passes through the perforated outlet of the funnel 10 into the chamber 1ʸ from whence the gas may be drawn through the outlet pipe 14 and delivered to the illuminating system. Should it be found that the gas delivered through the pipe 14 is too rich in gasolene, additional air may be admitted into the chamber 1ʸ by opening the valve 11ᵇ in the supplemental air pipe 11 and permitting the air to be discharged into the chamber 1ʸ through the perforated nozzle, in finely divided streams to cause an intimate mixture between the vaporized gasolene in the chamber 1ʸ and such air.

In order that the gasolene may be maintained on the upper surfaces of the partitions 8, 9 and 9ʸ and flow from the upper partition 8 back into the gasolene tank 20, I provide an elevator 21 which consists of an endless chain of buckets 21ª passed over idler pulleys 21ᵇ on shafts 21ᶜ, the lower shaft 21ᶜ being arranged so that the buckets 21ª will dip into the gasolene in the chamber 20 while the upper shaft 21ᶜ is arranged so that the buckets 21ª will discharge their contents onto the baffle 22, from which the gasolene flows through the slot 22ˣ in the vertical partition 22ʸ onto the partition 8 and from thence percolates downward until the excess gasolene reaches the gasolene chamber 20. The vertical partition 22ʸ extends from the partition 13 down to near the bottom of the gasolene chamber leaving a space between itself and the bottom of the gasolene chamber to allow the gasolene to maintain the same level in the gasolene chamber as in the elevator compartment.

In order that the blower 2ª may be operated simultaneously with the elevator 2 and vice versa, one of the elevator shafts, say the lower shaft 21ᶜ, projects to the outside of the casing and carries a sprocket or pulley 6ˣ, around which the endless belt or chain 6 passes.

So far as described, the manner in which this invention operates, will be best explained as follows: Assume the gasolene chamber 20 to have been filled with gasolene and the pipe 20ª closed, the operator desires to generate carbureted air during a predetermined period for, say, illuminating or other similar purposes. The cable 4 having been previously wound up on the windlass 3, with the weight 5 at the top the operator releases the shaft 2ᶜ to permit the weight 5 to operate the windlass (any suitable governor mechanism and lock device for holding the members inoperative at times may be provided, as the same, *per se*, forms no part of my present invention). As the weight 5 gravitates downwardly the cable 4 unwinds, causing the shaft 2ᶜ to turn and operate the blower, as well as the elevator 21, thus causing an air current to be set up from the blower chamber that is located within the walls 2ᵇ through the pipe 12 into the bell 15 and from thence downwardly into the gasolene chamber 20, where the air is liberated through the gasolene. At the same time the elevator 21 is carrying the gasolene from the chamber 20 and depositing it on the partition 8 from which it flows down to the chamber 20 and on its way more or less of it is vaporized by the passing air current (see arrows in Fig. 2) and the vapors of gasolene and air pass through the funnel 10 in the chamber 1ʸ and from thence to the supply pipe 14 from which the vaporized fluid may be withdrawn and used. Should any unevenness of the fan and elevator occur so that the elevator does not run steady, the bell 5 through its action will serve to maintain a steady current through the passage 16ª to the gasolene, from thence into the chamber 1ʸ, it being understood that the chambers 1ˣ and 1ʸ are not in direct communication with one another.

From the foregoing description taken in connection with the accompanying drawings, it is thought the complete construction, operation and numerous advantages of my invention will be readily understood by those skilled in the art to which my invention appertains.

What I claim, is:

1. In a carbureter, a casing, means dividing said casing into a plurality of independent chambers, one of said chambers being open, a bell held in said chamber, fluid held in said open chamber to coöperate with said bell to form a water seal therefor, another of said chambers forming a vaporizing chamber and a third of said chambers forming a gas receiving chamber, a series of partitions within said vaporizing chamber, said vaporizing chamber including a fuel receiving portion at the bottom thereof, means for elevating the fuel to the top of the vaporizing chamber to flow over said partitions, means for forcing air to said bell, means for conveying said air from said bell to the bottom of the vaporizing chamber and liberating the air into the fuel within the vaporizing chamber, and means for conveying the vaporized material from the vaporizing chamber into the gas chamber.

2. In a carbureter, a casing, means dividing said casing into a plurality of independent chambers, one of said chambers being open, a bell held in said chamber, fluid held in said open chamber to coöperate with the bell to form a water seal therefor, another of said chambers forming a vaporizing chamber, and a third of said chambers forming a gas receiving chamber, a series of partitions within said vaporizing chamber, said vaporizing chamber including a fuel receiving portion at the bottom thereof, means for elevating the fuel to the top of the vaporizing chamber to flow over said partitions, means for forcing air to said bell, means for conveying said air from said bell to the bottom of the vaporizing chamber and liberating the air into the fuel within the vaporizing chamber, means for conveying the vaporized material from the vaporizing chamber into the gas chamber, and a supplemental air feeding means for admitting air directly into said gas chamber.

3. In a carbureter, a casing, means dividing said casing into a plurality of independent chambers, one of said chambers being open, a bell held in said chamber, fluid held in said open chamber to coöperate with said bell to form a water seal therefor, another of said chambers forming a vaporizing chamber and a third of said chambers forming a gas receiving chamber, a series of partitions within said vaporizing chamber, said vaporizing chamber including a fuel receiving portion at the bottom thereof, means for elevating the fuel to the top of the vaporizing chamber to flow over said partitions, means for forcing air through said bell, means for conveying said air from said bell to the bottom of the vaporizing chamber and liberating the air into the fuel within the vaporizing chamber, means for conveying the vaporized material from the vaporizing chamber into the gas chamber, a supplemental air feeding means for admitting air directly into said gas chamber, an off-take pipe from said gas chamber, and means within said gas chamber adjacent to the off-take pipe for screening the gas as it passes to the off-take pipe.

4. In an apparatus of the class described, a blower, a single casing mounted over said blower, a series of partitions within said casing to divide the same into an upper open ended air chamber, a lower vaporizing chamber and an intermediate gas chamber, a liquid sealed air bell mounted in said open ended air chamber, means passing through said vaporizing chamber and said gas chamber for conveying air from the blower and discharging it into the air chamber, means surrounding said last named means for conveying air from the air chamber to the bottom of the vaporizing chamber.

5. In an apparatus of the class described, a blower, a single casing mounted over said blower, a series of partitions within said casing to divide the same into an upper open ended air chamber, a lower vaporizing chamber and an intermediate gas chamber, a liquid sealed air bell mounted in said open ended air chamber, means passing through said vaporizing chamber and said gas chamber for conveying air from the blower and discharging it into the air chamber, means surrounding said last named means for conveying air from the air chamber to the bottom of the vaporizing chamber, together with an independent means for conveying air from the blower and discharging it into the gas chamber.

6. In an apparatus of the class described, a blower, a single casing mounted over said blower, a series of partitions within said casing to divide the same into an upper open ended air chamber, a lower vaporizing chamber and an intermediate gas chamber, a liquid sealed air bell mounted in said open ended air chamber, means passing through said vaporizing chamber and said gas chamber for conveying air from the blower and discharging it into the air chamber, means surrounding said last named means for conveying air from the air chamber to the bottom of the vaporizing chamber, and a series of supplemental baffles mounted within the vaporizing chamber together with pendent baffles secured to the inside of said supplemental baffles.

GUSTAVE FRANZ SCHMIDT.

Witnesses:
   Edgar Allan, Jr.,
   M. M. Williams.